United States Patent [19]
Payen

[11] Patent Number: 6,105,251
[45] Date of Patent: Aug. 22, 2000

[54] INTEGRALLY RETAINED BEARING RACE WITH IMPROVED TWISTING RESISTANCE

[75] Inventor: David Hippolyte Payen, Erquinghem-Lys, France

[73] Assignee: General Motors Corporation, Detroit, Mich.

[21] Appl. No.: 08/954,050

[22] Filed: Oct. 20, 1997

[51] Int. Cl.$^7$ ................................................. B23P 17/00
[52] U.S. Cl. ................................ 29/898.066; 29/898.06; 29/898.061; 29/898.062; 29/898.063
[58] Field of Search ................ 29/898.06, 898.061, 29/898.062, 898.063, 898.066; 384/448, 512, 513, 537; 451/52

[56] References Cited

U.S. PATENT DOCUMENTS

| | | | |
|---|---|---|---|
| 4,179,167 | 12/1979 | Lura et al. | 308/189 A |
| 4,958,944 | 9/1990 | Hofmann et al. | 384/512 |
| 4,986,607 | 1/1991 | Hofmann et al. | 301/124 R |
| 5,061,090 | 10/1991 | Kriaski et al. | 384/537 |
| 5,226,738 | 7/1993 | Valette et al. | 384/513 |
| 5,240,333 | 8/1993 | Hassiotis et al. | 384/448 |
| 5,490,732 | 2/1996 | Hofmann et al. | 384/537 |
| 5,536,075 | 7/1996 | Bertetti | 301/105.1 |
| 5,822,859 | 10/1998 | Kessen et al. | 29/898.061 |
| 5,822,860 | 10/1998 | Wadsworth-Dubbert et al. | 29/898.061 |

*Primary Examiner*—David P. Bryant
*Assistant Examiner*—Essama Omgba
*Attorney, Agent, or Firm*—Patrick M. Griffin

[57] ABSTRACT

An improved method for retaining a separable bearing race to a inner bearing member and also preventing twisting of the separable race on the spindle. The end face of the separable race over which a portion of the spindle is deformed as a retaining bead is deliberately ground so as to be slightly inclined to, rather than square to, the spindle-race co axis. As a consequence, any force tending to twist the race on the spindle about the axis creates a strong axial wedging action between the tilted bearing end face and conforming bead surface, acting to prevent the race from twisting. The only change in the processing and assembly of the race and bearing needed is to set up the race grinding wheel with a slight incline.

1 Claim, 5 Drawing Sheets

INTEGRALLY RETAINED BEARING RACE WITH IMPROVED TWISTING RESISTANCE

TECHNICAL FIELD

This invention relates to methods of bearing manufacture and assembly, and specifically to a two row ball bearing of the type in which a separable race is integrally retained to a central spindle with improved resistance to turning of the separable race on the spindle.

BACKGROUND OF THE INVENTION

Bearings in which an inner race or spindle is supported within a surrounding outer race or hub by two axially spaced rows of rolling elements provide superior axial stiffness and load support. As a consequence, they are almost universally used for automotive wheel bearings, driven or non driven. The two rows of rolling elements are most often bearing balls, in modern designs, with convergent, angular contact pathways.

The manufacturer of two row ball bearings that support heavy loads must deal with the issue of retaining at least one separable ball race to the spindle. This is because, while it is simple to load a full complement of balls into the first row, the second row will have to have one pathway that is axially removable. Otherwise, the second row would have to be loaded with a technique such as radially displacing the spindle and hub and then loading the balls into the locally widened space so created. This allows for only a less than full complement of balls in the last installed ball row, which would drastically reduce load capacity. With a separable race, a full ball complement is achieved, but two other issues must be dealt with. The separable race must be installed so as to maintain a proper bearing preload or endplay and must be securely retained axially to the end of the spindle. In some older methods of assembly, both considerations are handled by the same structure. For example, a simple threaded nut can be torqued down against the separable race, pushing it axially against its ball row until the proper bearing preload is achieved. If the nut can be prevented from backing off by an adequate locking means, it both maintains the preload and retains the race. Nut locking is difficult to assure, however.

A more accurate and secure, if more complex system is disclosed in co assigned U.S. Pat. No. 4,179,167 issued Dec. 18, 1979 to Lura et al. A separable race slides onto the outer surface of the spindle freely until it hits the outer ball row. As it makes contact with the outer ball row, its outer edge rests past the inner wall of a groove machined into the spindle. The separable race is forced and held against its ball row by an assembly apparatus to the desired preload, and then the axial spacing of its outer edge from the outer wall of the groove is accurately gauged. Then, a pair of selected thickness keeper rings, chosen from a pre machined assortment, are tightly inserted between the outer edge of the separable race and the far wall of the spindle groove. The keeper rings hold the proper race location and so maintain the preload or end play as desired. Finally, a sleeve shaped retaining ring must be swaged down over the keeper rings to hold them radially down into the groove. While this assembly method has proved a solid and robust design for years, a less costly system, in terms of parts, assembly steps, or both, would be very desirable, if it could provide the same preload accuracy and durability.

The simplest possible separable race retention system, at least in terms of the total number of parts, is one that uses some portion of the spindle material itself to retain the separable race instead of a separate component, such as a nut or keeper rings. One such process that has received a good deal of attention in patents world wide is the so called cold forming or "riveting" process, illustrated in FIG. 1 of the drawings in the subject application. As seen in FIG. 1, what is proposed is to make the outboard ball row 10 run on a pathway that is integrated to a separable race 12 that also includes the wheel attaching flange. The outer annular face of the separable race 12 is ground flat, smooth and perpendicular to the central axis of spindle 18. A deformed bead or "collar" 16 is cold formed axially over the flat outer face of the separable race 12 to retain it axially to the spindle 18. How solidly and securely the separable race 12 is retained to the spindle 18 is a function not only of the degree of radial overlap between the bead 16 and the face of the race over which it is formed, but also a function of the continuity of contact between the inner, cylindrical mounting surface of the separable race 12 and the outer cylindrical support surface of the spindle 18. Their mutual contact interface should be both tight and continuous, that is, with no radial gap.

Even when continuous, gap free mutual contact between the mating cylindrical surfaces of the separable race and the spindle is achieved, however, the problem remains of preventing the separable race from turning or twisting on the spindle under bearing load. A smooth surface to surface contact resists turning only by virtue of the tightness and pressure of contact at the interface, which may work loose with time. One design, disclosed in U.S. Pat. No. 4,986,607 issued Jan. 22, 1991 to Hofmann et al, deals with the race turning problem by machining teeth or splines into the annular outer face of the separable race. The deformed bead of the spindle, as it is cold formed into a retention bead, it is concurrently formed into interlocking engagement with the teeth. This interlocking configuration resists race turning better than a simple friction fit between a smooth, flat race face and overlapping bead would do. The main drawback of such a system is the cost and difficulty of machining in separate splines or teeth into the separable race, which would have to be separately cut. Also, the bead would have to be cold worked very thoroughly and with a good deal of pressure to assure that it filled in around the sharp teeth.

SUMMARY OF THE INVENTION

The invention provides improved twist resistance to a separable bearing race without the necessity for machining a series of separate splines or teeth into the race end face.

In the preferred embodiment disclosed, a deformable annular lip of conventional thickness and shape is provided on the end of the spindle. A shoulder is machined on the spindle to abut the inner end face of the separable race, which is conventionally ground to be flat and perpendicular to the central axis. A conventional length of the lip is "unsupported," that is, it extends axially past the outer face of the separable race, over which it is later deformed into a race retaining bead. The outer face of the separable race is also ground smooth, with no splines or teeth, and is ground substantially flat. However, it is not ground absolutely perpendicular to the central axis of the spindle-race central co axis. Instead, it is ground with a shallow incline or angle relative to the central axis. When the bearing is assembled, the separable race is installed by a tight press fit onto the spindle and against the shoulder, and its pathway is ground and carefully gauged in the installed position. The unsupported, remaining length of the lip is then conventionally headed over, pressed and rolled axially inwardly and radially outwardly over the separable race's inclined outer end face, conforming to and taking on its same inclined orientation. In operation, any tendency of the separable race to turn on the spindle, about the central axis, is strongly resisted by the fact that the interface between the inclined outer face of the retained race and the conforming inner surface of the retention bead creates an axial jamming or wedging effect in reaction.

BRIEF DESCRIPTION OF THE DRAWINGS

These and other objects of the invention will appear from the following written description, and from the drawings, in which.

DESCRIPTION OF THE PREFERRED EMBODIMENT

Figure 9:
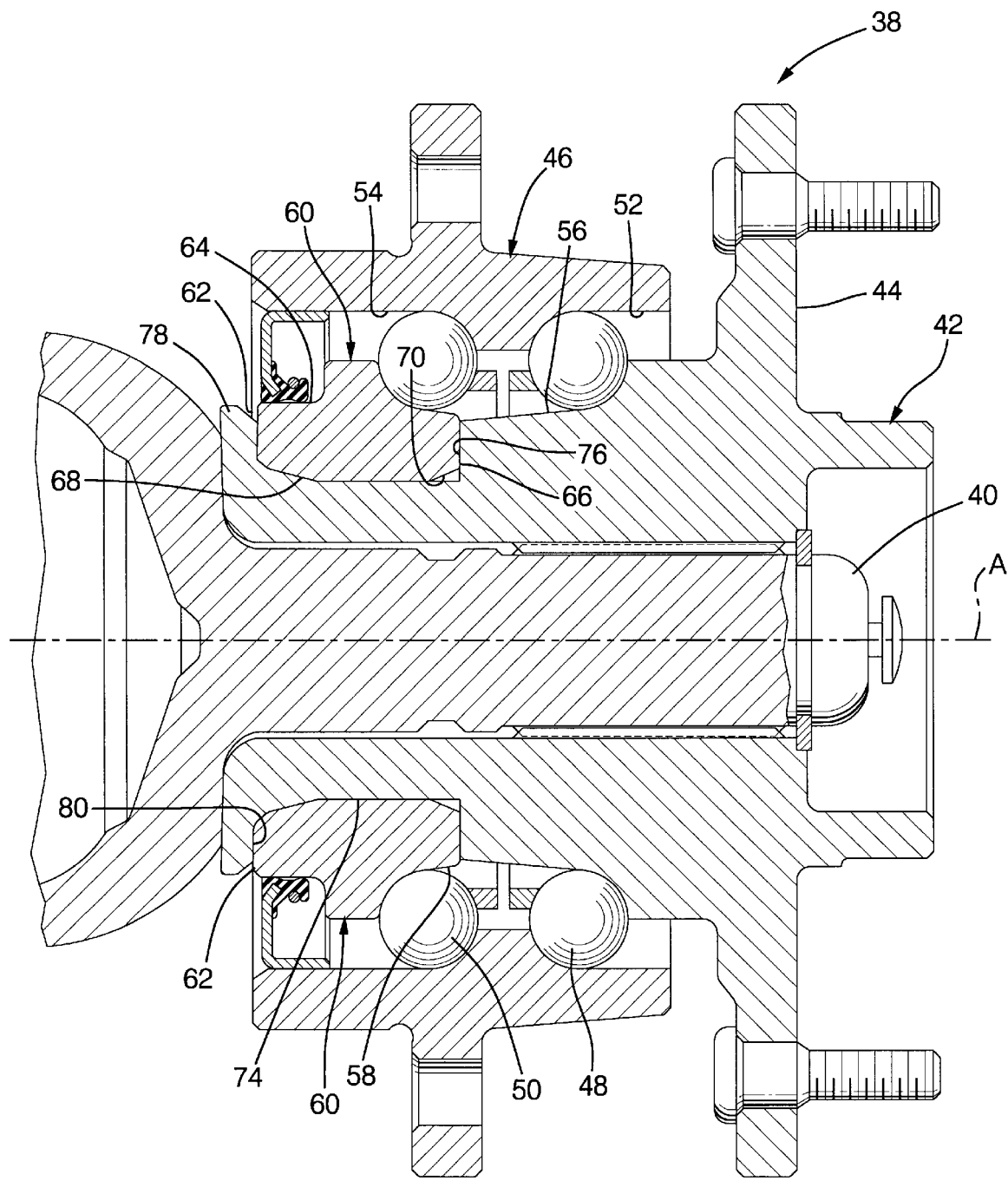
FIG. 9 shows the completed bearing.

Referring first to FIG. 9, a vehicle wheel bearing made according to the invention is indicated generally at 38. Bearing 38, as shown, is a driven bearing, meaning that a drive shaft 40 passes through it, specifically through the splined, hollow center of the inner race or "spindle", indicated generally at 42. However, it could just as easily be a non driven, trailing bearing. Either way it is spindle 42 that rotates and carries the wheel attachment flange 44 at its outboard end. Spindle 42 rotates about a central axis A, which also defines all cylindrical and annular surfaces of the various components. The outer race or "hub", indicated generally at 46, is stationary and bolted to the non illustrated vehicle suspension. Two ball rows, an outboard ball row 48 and inboard ball row 50, are full complement and axially spaced apart, so as to provide good load support and axial stiffness. The ball rows 48 and 50 run on two pairs of convergent angular contact pathways. These are an outboard outer pathway 52 and inboard outer pathway 54, both ground integrally into hub 46, an outboard inner pathway 56, ground integrally into spindle 42, and an inboard inner pathway 58. Inboard inner pathway 58 is ground into a separable, generally ring shaped race, indicated generally at 60. Separable race 60 is shown in FIG. 9 after installation to spindle 42, by a basically conventional riveting process described in more detail below. Race 60 itself is manufactured with a novel structural feature, however, which, when combined with the conventional riveting process, provides an improved resistance to twisting on the spindle 42.

Figure 1:
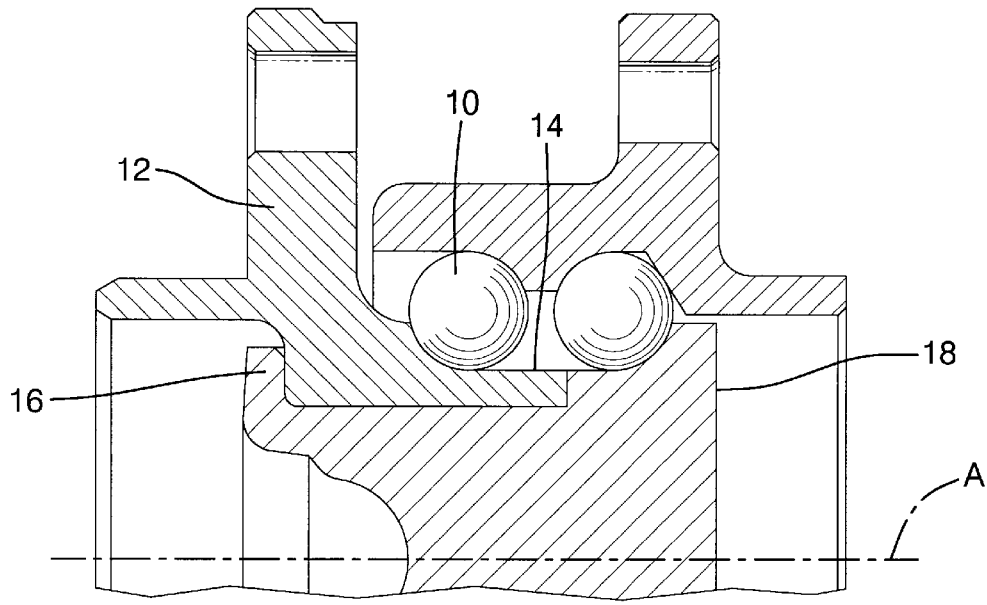
FIG. 1 is a cross section of a prior art bearing with a flat end face square to the central axis, as described above.
Figure 2:
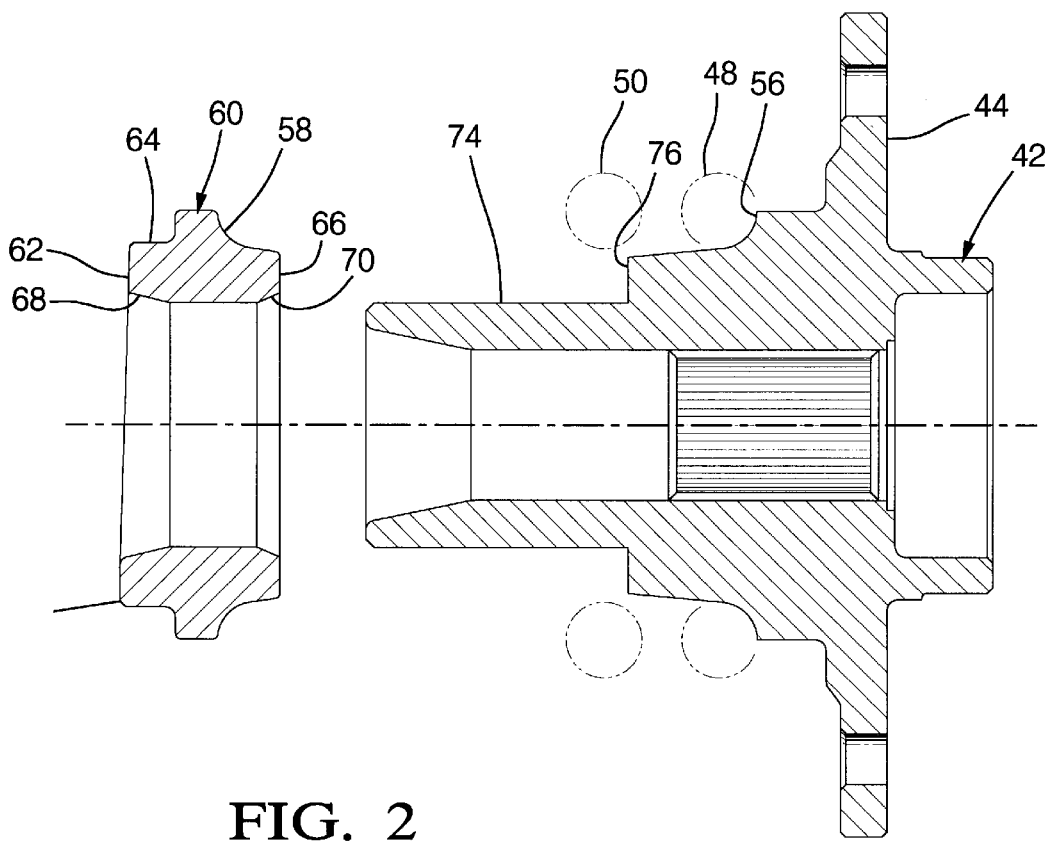
FIG. 2 is a cross section of a separable race made according to the invention, removed from the spindle, with the spindle lip in an undeformed state.
Figure 3:
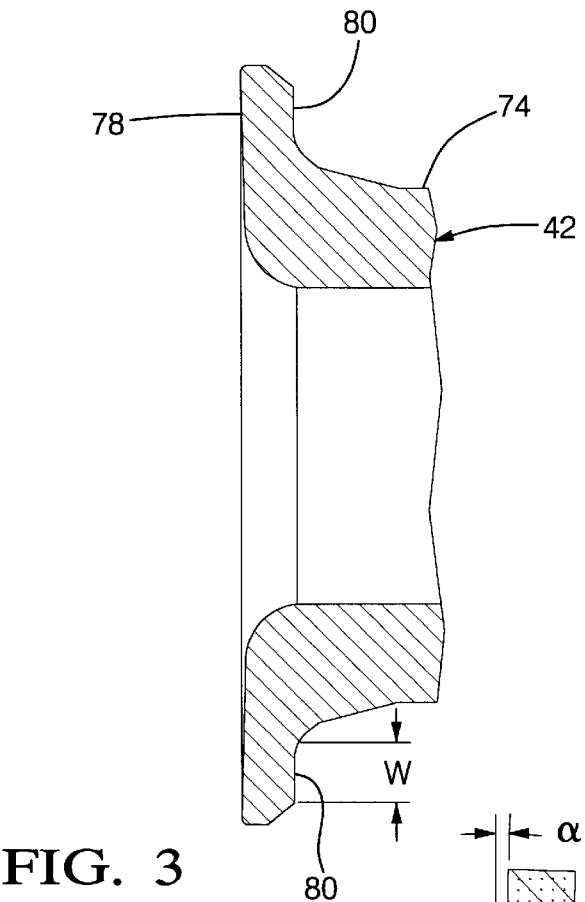
FIG. 3 shows the spindle lip as it would be deformed over the outer face of the separable race, but with the race removed so as to show the inner surface of the bead.

Referring next to FIGS. 2 and 3, additional structural detail of race 60 and its relation to spindle 42 are illustrated. Separable race 60 is basically an annular steel ring, which is only as axially long and as radially thick as is necessary just to provide the inboard inner pathway 58 for the last installed ball row 50. Its axial length is defined between a pair of generally annular end faces, an outer end face 62, which is adjacent to a cylindrical seal surface 64, and an inner end face 66, which is adjacent to the inboard inner pathway 58 noted above. The inner surface of race 60 is cylindrical, but for a shallow conical relieved portion 68 at the outer end and a sharper and shorter chamfer 70 at the inner end. Annular outer end face 62 is a physically distinct and segregated surface of race 60, defined by its location and orientation. Specifically, outer annular end face extends radially continuously between two distinct boundaries. Those radial boundaries are a radially inner circular edge created by its intersection with conical relieved portion 68 (or with come other radially inner surface of race 60), to a radially outer edge created by its intersection with cylindrical seal surface 64 (or with some other radially outer surface of race 60). Normally, end face 62 is perpendicular to the central axis A, and is substantially perpendicular here, but not perfectly, as is described in detail below. Spindle 42 is already hollow through the center, and is therefore easily provided with a deformable lip 72. Lip 72 is really just a sleeve like extension of the cylindrical support surface 74 of the hollow spindle 42, and therefore has the same diameter initially as surface 74, but really has no discrete, individual axial length per se. If the spindle 42 were solid, as in a trailing bearing, then the lip would be formed by a central bore cut into the axially inner end of the spindle, and the lip would have a discrete, individual axial length. Lip 72 is also tapered slightly over its inner surface to make it more easily deformed. A stop shoulder 76 is ground perpendicular to spindle outer surface 74, near of the integral outboard inner pathway 56, which abuts to the race inner end face 66 when race 60 is installed by "heading over" the lip 72. While the installation of race 60 is described in detail below, it is useful to illustrate the post installation shape of lip 72 alone, without the race 60, even though it does not actually exist alone at any point. As seen in FIG. 3, lip 72 has been formed into an integral bead 78, the annular inner surface 80 of which ultimately overlaps with and abuts the race outer end face 62. After formation, the bead inner surface will have a predetermined radial width indicated at W. The surface 80 is formed by being molded into close conformance with the race outer end face 62, and will match whatever shape it has. That is, a smooth end face 62 would produce a smooth bead surface 80. Conversely, grooves in the race end face 62 would ultimately produce interfitting, matching ridges in the bead surface 80, as in the U.S. Pat. No. 4,986,607 designed noted above. However, the material of bead 78 would have to be very thoroughly worked to assure complete filling of discrete, narrow grooves or splines by the cold worked material. Here, a unique shape and configuration of the outer race end face 62 produces a correspondingly novel conforming shape of the bead inner surface 80, as is described next.

Figure 4:
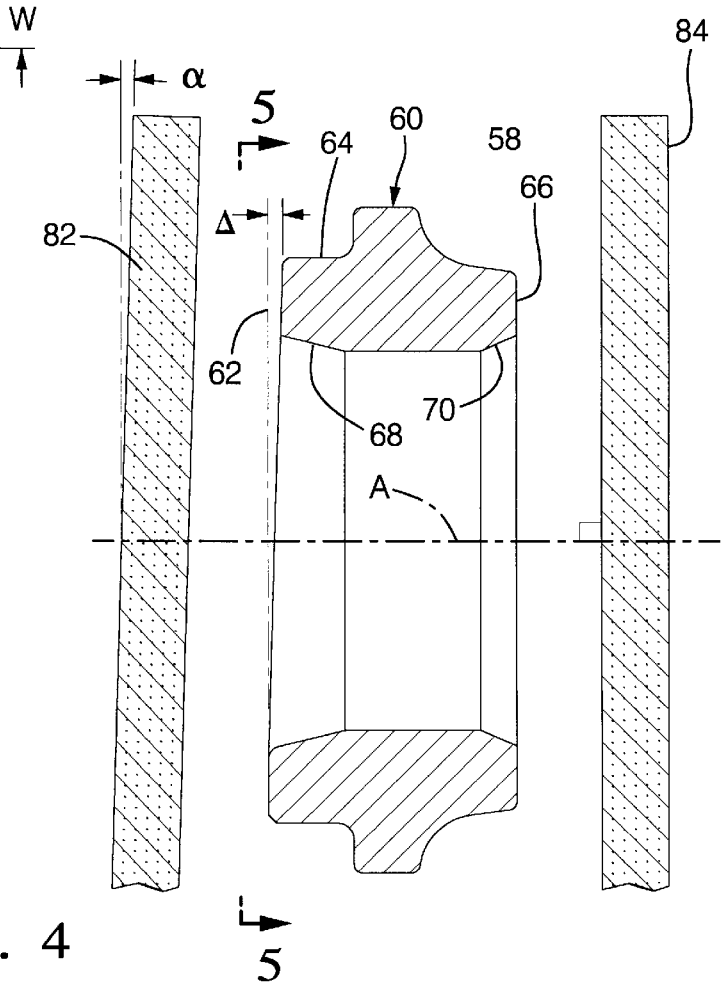
FIG. 4 illustrates how both the inner and outer end face of the separable race are ground.
Figure 5:
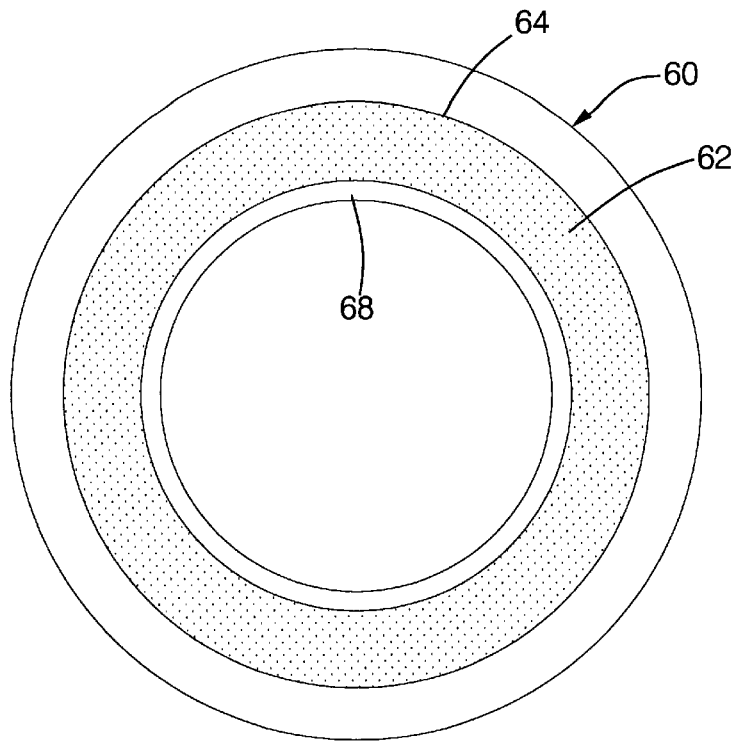
FIG. 5 shows the outer end face of the race prior to being ground.
Figure 6:
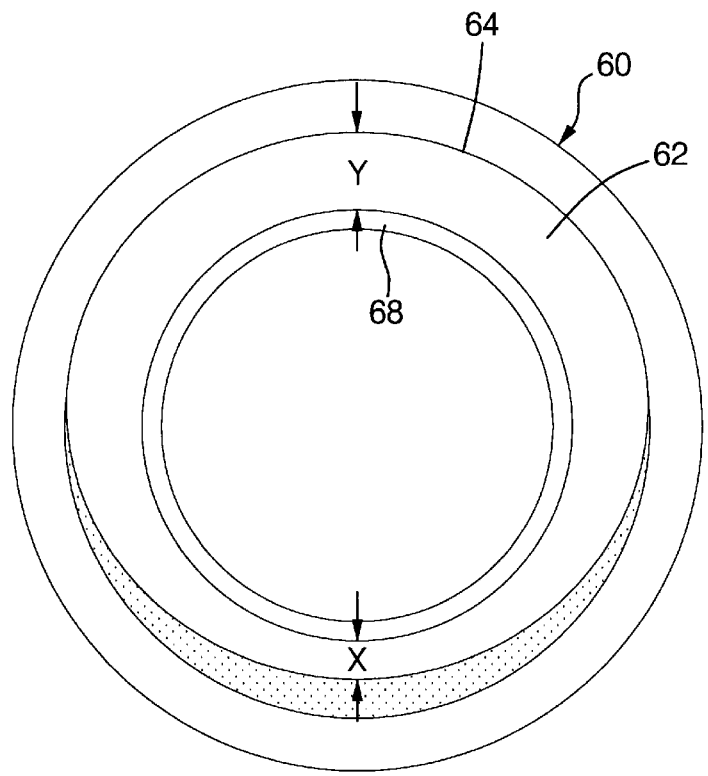
FIG. 6 shows the outer end face of the race after grinding to an inclined orientation.

Referring next to FIGS. 4 through 6, the novel method by which race 60 is processed to produce the unique configuration of the outer end face 62 is illustrated. Two flat grinding wheels 82 and 84 are used to grind the outer and inner end faces 62 and 66 respectively. Inner grinding wheel 84 is, as is conventional, oriented exactly perpendicular to the central axis A, and so grinds the inner race end face 66 flat and perpendicular to the central axis A, taking off the same thickness of material at all points around the circumference of the end face 66. Outer wheel 82 is spun at the same rate as inner wheel 84, axially advanced at the same rate, and so on, but rather than being square, it is tilted at a relatively small angle α relative to the central axis A. Relatively small, in this instance, means very small, only a few degrees at most, and approximately one degree as disclosed. Deliberately grinding a bearing race end face so as to be not square to its axis is completely counter intuitive, of course, and would normally be considered a manufacturing defect in an area where every component structural feature is normally kept rigidly concentric to or square to a central axis. The end result of the tilted grinding operation may be seen by comparing FIG. 5, which indicates the unground race outer end face 62 by stippling, and FIG. 6, which indicated the ground face 62 without stippling. Most of the surface area of end face 62 is touched and ground by the wheel 82. However, the small axial advance of the tilted wheel 82 into the end face 62 results in a narrow lunette of the original surface of end face 62, shown at the bottom of FIG. 6, being untouched and unground. This occurs because the tilted grinding wheel 82 is axially advanced no farther than usual, and so does not advance far enough to reach this unground area. The ground area of end face 62 is thus narrower near the bottom, at the point indicated at X, but is full width at the top, at the point marked Y, in FIG. 6. Even at its narrowest, however, the ground area of end face 62 is still as wide as the width W of bead inner surface 80 noted above. The larger area of end face 62 that is reached and ground by the surface of the tilted grinding wheel 82 is flat and smooth, but is not perfectly perpendicular to the axis A. Instead, it takes on the same slight incline of about one degree. Slightly more material is axially ground off near the point Y, and essentially none at the point X, with continually more being ground off moving from X to Y. No material is ground away at all in the lunette that the face of wheel 82 does not reach, of course. There is therefore a theoretical mass imbalance between the points X and Y, but, as a practical matter, the mass differential is so slight as to cause no dynamic or balance problems. For example, at the diameters normal for a race end face 62, and with a grind wheel tilt of a degree, even the maximum axial thickness of material ground away right at point Y, indicated at Δ in FIG. 4, would be only about 0.030 inches. While this is a very slight physical change, it results in an improved performance described below. Again, it should be kept in mind that the only process change made in manufacturing the race 60 would be the initial set up of the outer grinding wheel 82 so as to give it the slight incline. Every other parameter and step would remain the same, and would be transparent to the process operator.

Figure 7:
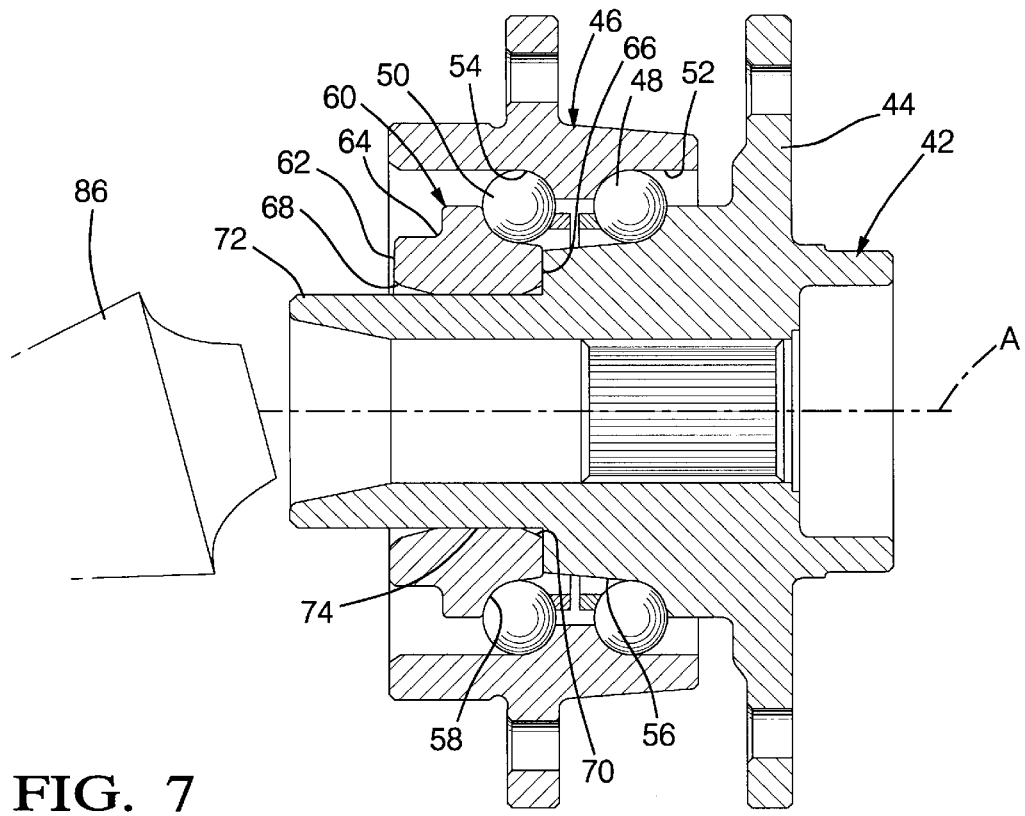
FIG. 7 shows the bearing assembled and the race installed over the spindle, prior to formation of the retaining bead.
Figure 8:
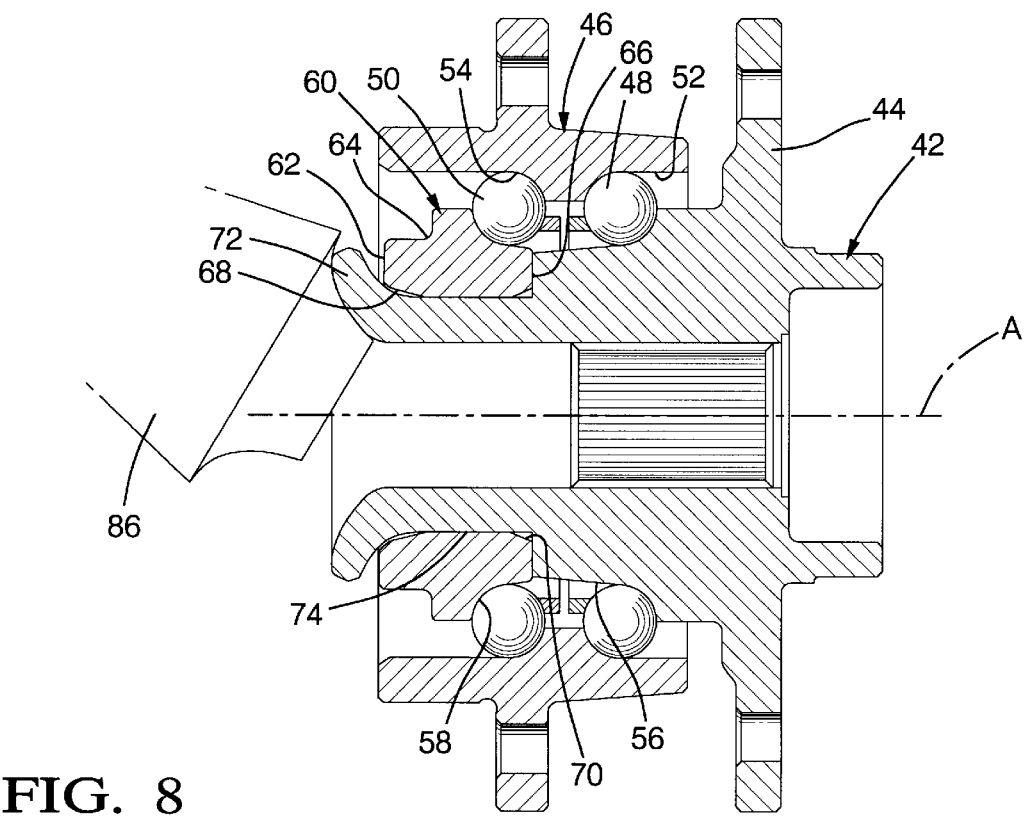
FIG. 8 shows the retaining bead in the process of being formed.

Referring next to FIGS. 7 and 8, the process of assembling bearing 38 and race 60 after its end face 62 had been ground is described. Here, too, the basic process is carried out exactly the same as it would be conventionally. Before the final assembly of bearing 38, separable race 60 is initially and temporarily press fitted tightly onto and over the end of spindle 42 until its inner edge abuts the stop shoulder 76. Then, both inner pathways 56 and 58 are ground at once, as if the spindle 42 and race 60 were one integral part. Concurrently, both outer pathways 54 and 52 are ground into hub 46. Before separable race 60 is removed again, the ground pathways 56 and 58 are gauged relative to a standard reference frame, as are the pathways 52 and 54 on hub 46. Then, suitable size balls 48 and 50 are chosen so as to fit up between the opposed pathways 52–56 and 54–58 respectively with the desired axial preload or end play. Then, race 60 is removed with a suitable pulling apparatus. Next, the outboard ball row 48 is installed against the outboard inner pathway 56 of spindle 42, and hub 46 is moved freely over spindle 42 until its outboard pathway 52 hits the outboard ball row 48. There is no problem in making the outboard ball row 48 a full complement, of course, because there are no physical barriers to free ball entry. Then, the full complement inboard ball row 50 is installed against the inboard ball pathway 54 of hub 46 which is possible since the separable race 60 is not yet installed or in the way. Next, the separable race 60 is reinstalled, making the same tight press fit over the spindle support surface 74 until it abuts stop shoulder 76. The sharp chamfer 70 on the inner edge of race 60 assures a good, flat to flat contact with the stop shoulder 76. At this point, because of the tight press fit of race 60, the desired preload or axial end play is created, based on the grinding, gauging, and ball selection steps already carried out. It remains only to assure that race 60 is axially retained to spindle 42 and snug against stop shoulder 76.

Referring next to FIGS. 7 and 8, the retention of race 60 is achieved by "heading over" or roll forming the lip 72 with the conventional roll forming tool shown at 86, which is rocked or "orbited" around the axis A and pushed axially inwardly forcefully at the same time. Bearing 38 and spindle 42 are supported in a non illustrated solid base during this operation. Concurrently, lip 72 is forced axially inwardly and rolled radially outwardly, gradually deforming it into the bead 78 described above. Lip 72 need not have any particular radial thickness, hardness, taper angle, or unsupported length initially . Lip 72 simply needs enough unsupported material extending axially past the race end face 62 (and enough radial thickness) to allow it to be deformed into a bead 78 with sufficient strength and radial width to axially retain race 60. That would be true for any lip deformed into a race retaining bead, and the exact dimensions needed will vary from case to case. While bead 78 must conform closely the race end face 62 it need not be forced against it by tool 86 with any particular axial pressure, since it is not intended to establish or maintain bearing preload, in the way that a tightened retention nut might. Some of the material of lip 72 pushed inwardly by tool 86 is deformed into and fills the race conical relieved portion 68, which acts to accommodate any radial swelling that might jeopardize continuous contact with the inner surface of race 60. Concurrently, as bead 78 is formed, its inner surface 80 is molded against the face 62, and radially overlaps most of it. The bead inner surface 80 is not radially wide enough to overlap the thin lunette of unground surface area noted above, which is still perpendicular to the axis A. Instead, the bead inner surface 80 overlaps only with the inclined ground area of end face 62, and takes on exactly its shape and incline relative to axis A. This shape of the bead inner surface 80, and specifically its non square orientation to axis A, improves the retention of race 60.

Referring next to FIGS. 6 and 9, in the completed bearing 38, the frictional force of the inboard ball row 50 running on the race 60 can cause it to tend to twist on the spindle 42, if the fit up at the smooth cylindrical interface between the race 60 and the spindle surface 74 is not tight enough to prevent it. In order for the race 60 to be able to turn relative to spindle 42, about central axis A, the outer end face 62 must be able to slide freely on the bead inner surface 80 with which it is abutted. This would be possible if both surfaces were square to the central axis A, but neither is. Instead, as the inclined race outer end face 62 attempts to turn about axis A, fully a hundred and eighty degrees of its ground surface is turned against and into an abutted area of the bead inner surface 80 that is continually sloping axially toward it, in relative terms. Therefore, that half of the interface between the inclined race end face 62 and matching bead surface 80 is axially jammed and wedged, in reaction to and in proportion the force with which race 60 attempts to twist around axis A. Consequently, any such twisting of race 60 is strongly resisted and prevented. The total amount of surface area being axially jammed or wedged together at the interface is clearly equal to or greater than that which would be provided by a plurality of discrete teeth or splines cut into the end face 62. Furthermore, this strong anti twisting action is obtained essentially for free by processing the end face 62 as described. All tooling and method steps are the same, but for the initial tilt angle with which the outer grinding wheel 82 is set up. The race end face 62 is no more costly to produce than a squarely ground end face. The bead 78 is formed by the usual method, as well, and is still molded against a surface that is flat, although inclined. The bead 78 would not have to be cold worked with enough pressure to mold any of its material into a discrete groove or spline.

What is claimed is:

1. A method for assembling a bearing of the type having a spindle and a generally ring shaped separable race that press fits over a cylindrical support surface of said spindle and which is subject to turning on said support surface about a central axis, said race having an outer end face extending radially continuously from an inner circular edge formed by the intersection of outer end face with a radially inner surface of said separable race to an outer circular edge formed by the intersection of said outer end face with a radially outer surface of said separable race, said method comprising the steps of;

providing a radially outwardly and axially inwardly deformable annular lip on said spindle support surface, grinding said race outer end face with a relatively small incline angle relative to said central axis, installing said separable race over said spindle support surface with said annular lip extending axially beyond said race outer face, deforming said spindle integral lip axially inwardly and radially outwardly sufficiently to form a bead with an inner surface that abuts and closely conforms to said ground race end face, whereby, said separable race is both axially retained to said spindle and also prevented from turning on said spindle support surface about said central axis by virtue of said inclined race end face being wedged axially into said conforming bead inner surface.

* * * * *